US007273413B2

(12) United States Patent
Frink

(10) Patent No.: US 7,273,413 B2
(45) Date of Patent: Sep. 25, 2007

(54) VEHICLE EXHAUST SYSTEM HOSE AND COUPLING ASSEMBLY

(76) Inventor: Robert Frink, 2253 30th St., Rock Island, IL (US) 61201

( * ) Notice: Subject to any disclaimer, the term of this patent is extended or adjusted under 35 U.S.C. 154(b) by 363 days.

(21) Appl. No.: 10/790,290

(22) Filed: Mar. 1, 2004

(65) Prior Publication Data

US 2005/0189031 A1 Sep. 1, 2005

(51) Int. Cl.
  *B08B 15/00* (2006.01)
  *B60D 1/58* (2006.01)
(52) U.S. Cl. ............................. 454/63; 454/64; 285/62
(58) Field of Classification Search ................. 285/62, 285/1; 454/63, 64
  See application file for complete search history.

(56) References Cited

U.S. PATENT DOCUMENTS

| | | | |
|---|---|---|---|
| 1,112,681 A | | 10/1914 | Crane |
| 2,023,263 A | * | 12/1935 | Blume .......................... 285/84 |
| 3,473,462 A | | 10/1969 | Imming |
| 3,695,646 A | * | 10/1972 | Mommsen .................. 285/261 |
| 4,102,254 A | * | 7/1978 | Grant ............................ 454/63 |
| 4,719,752 A | * | 1/1988 | Hall .............................. 60/322 |
| 4,779,904 A | * | 10/1988 | Rich ........................... 285/345 |
| 4,906,032 A | | 3/1990 | Hohman |
| 5,092,228 A | | 3/1992 | Pfeiffer, Jr. et al. |
| 5,096,230 A | * | 3/1992 | Pausch et al. ................ 285/9.1 |
| 5,162,017 A | * | 11/1992 | Nordin ......................... 454/63 |
| 5,330,234 A | * | 7/1994 | Sweeny ......................... 285/62 |
| 5,362,273 A | * | 11/1994 | Pfeiffer et al. ................ 454/63 |
| 5,388,865 A | * | 2/1995 | Hawkins ....................... 285/89 |
| 5,453,048 A | * | 9/1995 | Zima et al. .................... 454/63 |
| 5,518,447 A | * | 5/1996 | Nordin ......................... 454/63 |
| 5,609,298 A | * | 3/1997 | Hyslop ........................ 239/289 |
| 5,630,751 A | * | 5/1997 | Hansen ......................... 454/64 |
| 5,679,072 A | * | 10/1997 | Brodin et al. ................. 454/63 |
| 5,722,461 A | * | 3/1998 | Lake ............................ 138/35 |
| 5,791,980 A | * | 8/1998 | Kramer, Jr. ................... 454/64 |
| 5,826,920 A | * | 10/1998 | Bartholomew .............. 285/305 |
| 5,911,623 A | * | 6/1999 | Trana et al. ................... 454/63 |
| 5,927,759 A | * | 7/1999 | Hyslop ........................ 285/9.1 |
| 6,012,978 A | * | 1/2000 | Svensson et al. ............. 454/63 |
| 6,306,031 B1 | * | 10/2001 | Hansen et al. ................ 454/64 |
| 6,482,080 B2 | * | 11/2002 | Wilson et al. ............. 454/119 |
| 6,983,757 B1 | * | 1/2006 | Becker et al. ................ 137/14 |
| 2001/0031618 A1 | * | 10/2001 | Wilson et al. ............. 454/119 |

* cited by examiner

*Primary Examiner*—James M. Hewitt
(74) *Attorney, Agent, or Firm*—James B. Eagle

(57) ABSTRACT

An improved de-coupling device for vehicle exhaust systems specifically emergency vehicle exhaust systems. In this application, flexible hoses are normally utilized as a conduit for exhaust fumes. This invention incorporates a tether inside the flexible hose thereby alleviating tension on the flexible hose. The weight of the nozzle elbow and the natural moment that is produced when a fire truck leaves the fire station with the nozzle on offers an ideal application for the snap ring assembly. The tether and the flexible hose are typically straight or near straight and when the fire truck leaves the station, tension is supplied by the cable, and when a sufficient moment is generated, the nozzle breaks free.

2 Claims, 5 Drawing Sheets

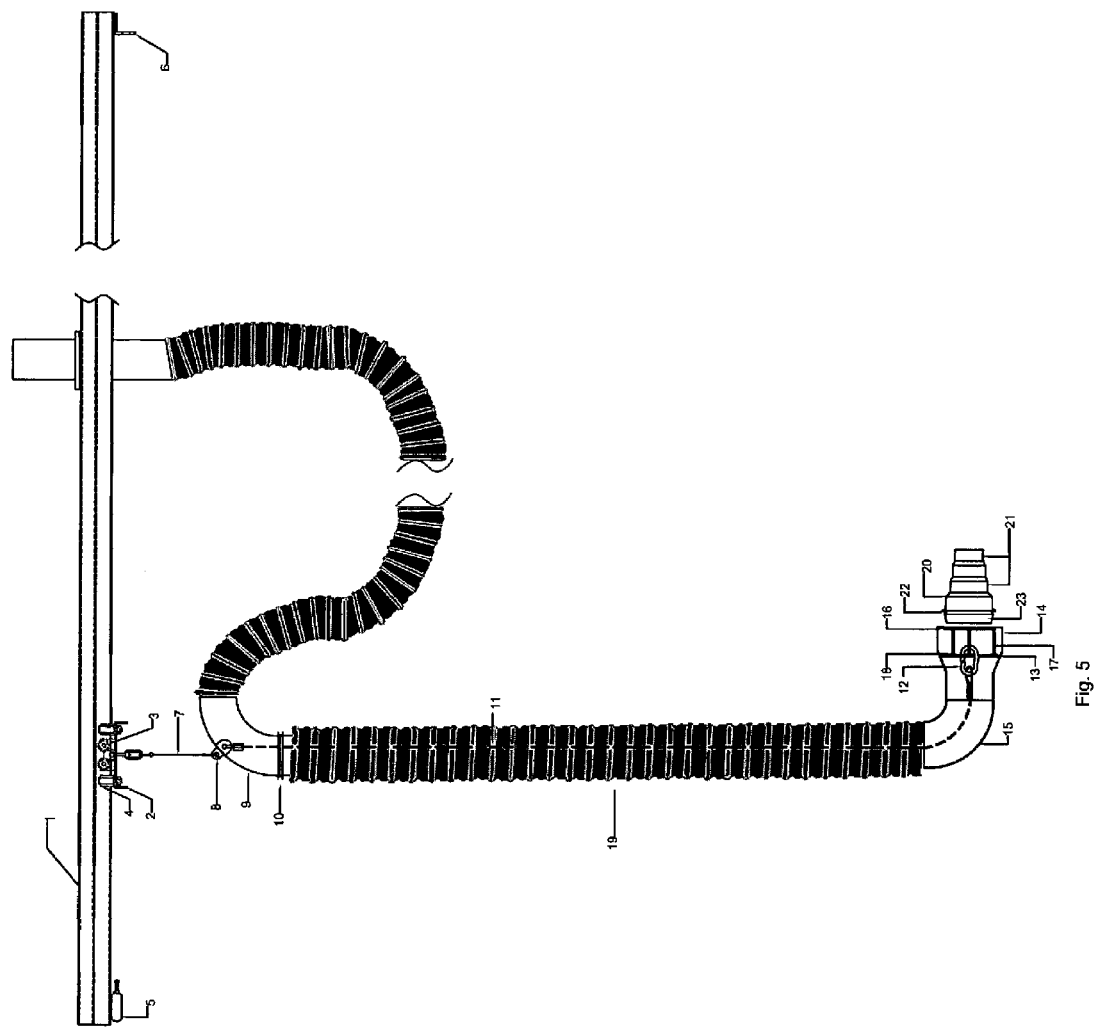

VEHICLE EXHAUST SYSTEM HOSE AND COUPLING ASSEMBLY

BACKGROUND OF THE INVENTION

1. Field of the Invention

This invention relates to a vehicle exhaust hose, specifically, an exhaust hose which is connected to a vehicle tail pipe or exhaust pipe so that the vehicle can be idling indoors and then driven out of the building/garage. This invention is particularly well suited for fire trucks and other emergency vehicles. The device easily snaps on and, when the truck leaves, snaps off automatically.

2. Description of Prior Art

The Crane Patent (U.S. Pat. No. 1,112,681) involves a metal hose with a check valve and a fastening device for vehicle exhaust of stationary vehicles.

The Imming Patent (U.S. Pat. No. 3,473,462) is a vehicle exhaust system with a fan. The placement of the exhaust hose is accomplished with winches and is designed for stationary vehicles.

The Hohman Patent (U.S. Pat. No. 4,906,032) is a devise for fitting an exhaust hose onto a tailpipe using a spring pressing against the inside surface of the tailpipe and is designed for stationary vehicles.

The Pfeiffer Patent (U.S. Pat. No. 5,092,228) is a vehicle exhaust system with a solenoid operated damper, a blower, and a flexible hose suspended by a trolley on a track.

The Pausch Patent (U.S. Pat. No. 5,096,230) is a quick release adapter for fastening the exhaust removal hose to a tailpipe. The mating is accomplished by utilizing magnets which can corrode. The external cables are also dangerous as they can get caught on other equipment or personnel.

The Zima Patent (U.S. Pat. No. 5,453,048) is a coupling assembly for fastening a vehicle exhaust hose to a tailpipe utilizing a "garter" spring. This garter spring allows a disconnect when the vehicle moves away.

The Nordin Patent (U.S. Pat. No. 5,518,447) is an exhaust extraction devise that attaches to the vehicle at two points: the tailpipe and a location near the tailpipe.

The Hyslop Patent (U.S. Pat. No. 5,927,759) is a leak-free connection assembly for an exhaust extraction system. Said assembly utilizes magnets and a thick walled flexible-synthetic nozzle and automatically detaches.

The Hansen Patent (U.S. Pat. No. 6,306,031) is an emergency vehicle exhaust system utilizing an exterior tether and also detaches automatically.

The prior art has external cables that can get caught on personnel or equipment. The novel snap ring is also an improvement on the prior art.

SUMMARY OF THE INVENTION

The present invention is an improved automatic detaching coupling for use, primarily, in emergency vehicle exhaust applications. The fire truck exhaust pipe is fitted with an Exhaust Pipe Adapter which forms the male portion of the coupling. The female portion of the coupling is a nozzle fitted with a snap ring. Said nozzle allows for the introduction of ambient air. The Exhaust Pipe Adapter, which is designed to be permanently disposed on the exhaust pipe, has a groove cut into its outer circumference. The groove accommodates the snap ring. Said snap ring is circular, but with a cut through the circle so it is not a continuous circle. This snap ring snaps on and off the groove with relative ease and provides good action. In other words there is a distinct signal (i.e. snap) whenever the snap ring snaps on or off the groove.

Around the outside of the snap ring is a funnel shaped stainless steel nozzle which is welded to a 90° elbow. The elbow has an outer diameter approximately equal to the inner diameter of flexible hose (approximately five inches).

A second, upper elbow is suspended from a trolley via an upper static cable. The upper static cable runs from the trolley to the aforementioned upper elbow. Specifically, the upper static cable is attached to an outside eyelet of a cable bracket. Said cable bracket is connected to the upper elbow and penetrates said elbow so that one eyelet of said cable bracket is outside the elbow and one eyelet of said cable bracket is inside said elbow. A lower length of static cable is attached to the eyelet of the cable bracket which is inside the upper elbow. The lower length of static cable runs from said cable bracket to the nozzle elbow at a point, preferably at the center of the lower elbow. A nozzle snap ring mounting bracket is permanently disposed on the inside circumference of the nozzle elbow and provides an anchor for the snap ring and the static cable. The snap ring is bolted to the nozzle snap ring mounting bracket at three places corresponding to the three legs of the snap ring. The non-loadbearing flexible hose simply runs from elbow to elbow thereby concealing the load bearing lower portion of the static cable.

BRIEF DESCRIPTION OF THE DRAWINGS

FIG. ONE is a side view of the Exhaust Pipe Adapter.

FIG. TWO is a front view of the Nozzle Snap Ring Mounting Bracket.

Figure 1:
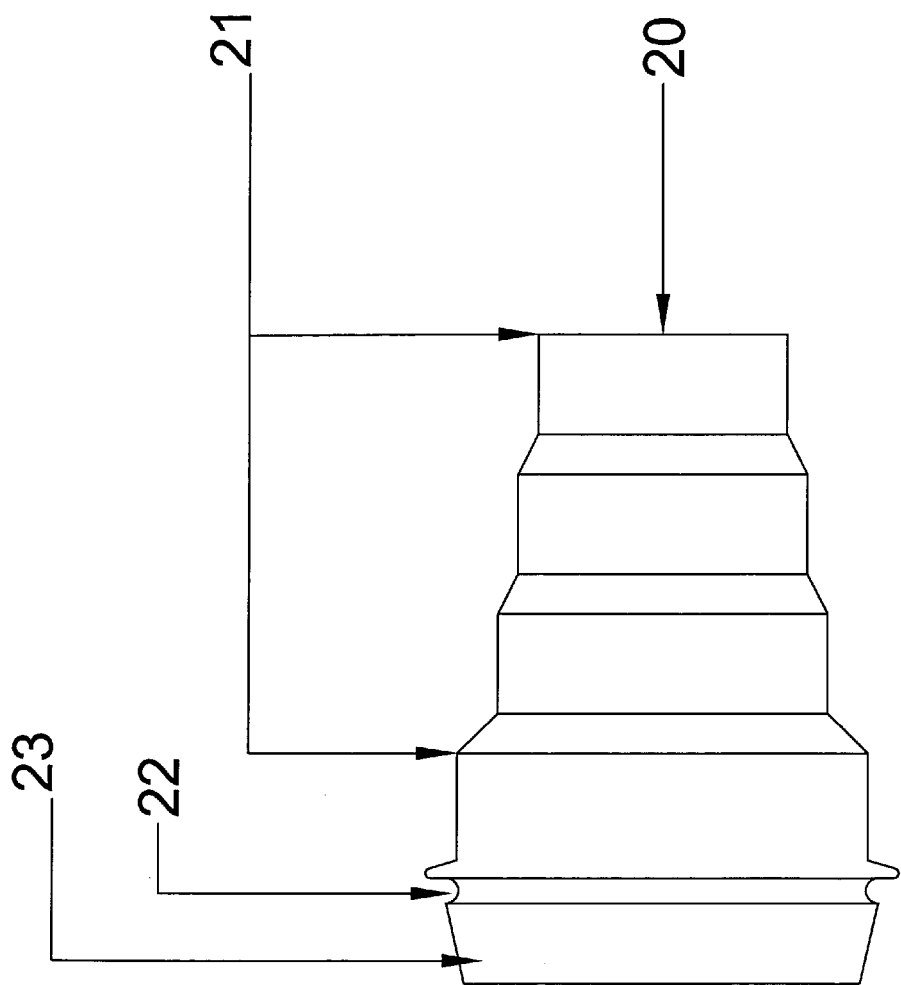
Figure 2:
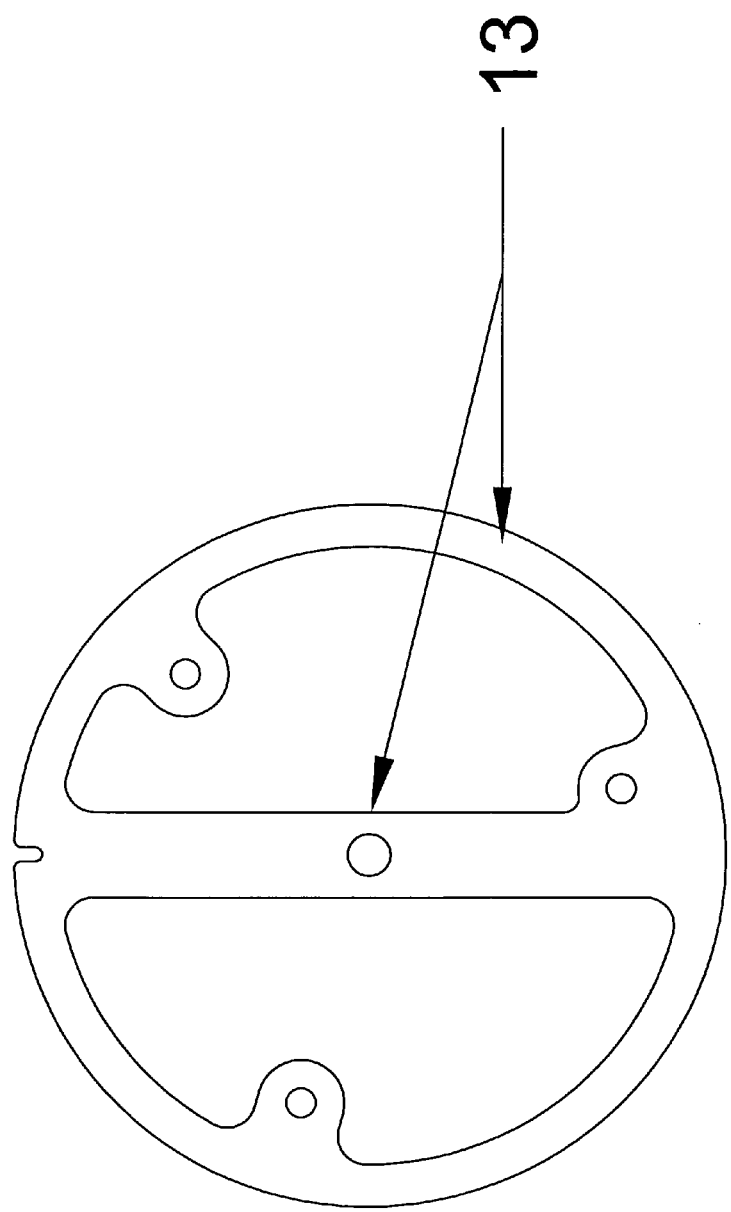
Figure 3:
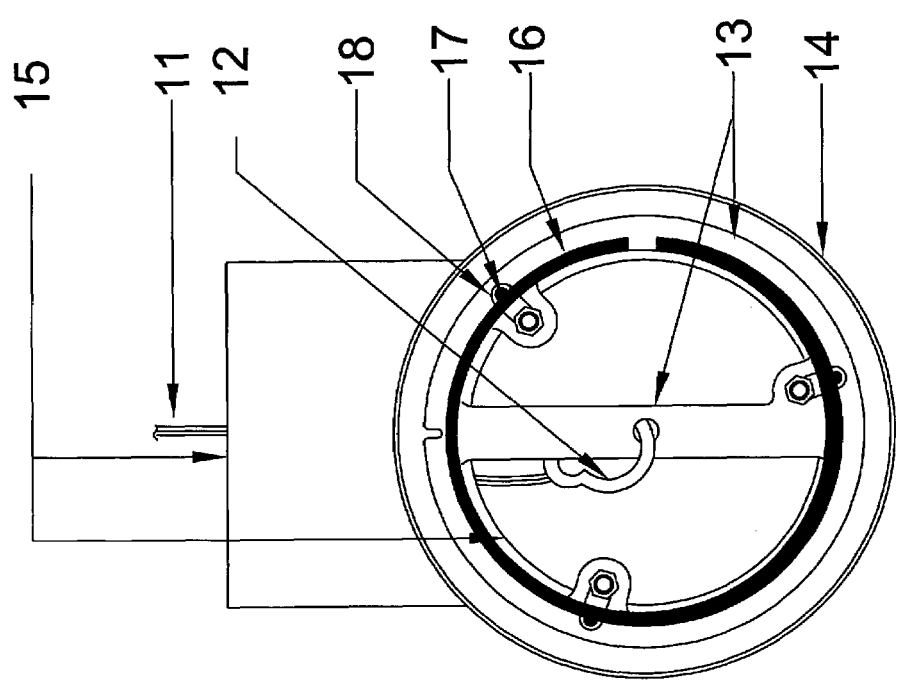
Figure 4:
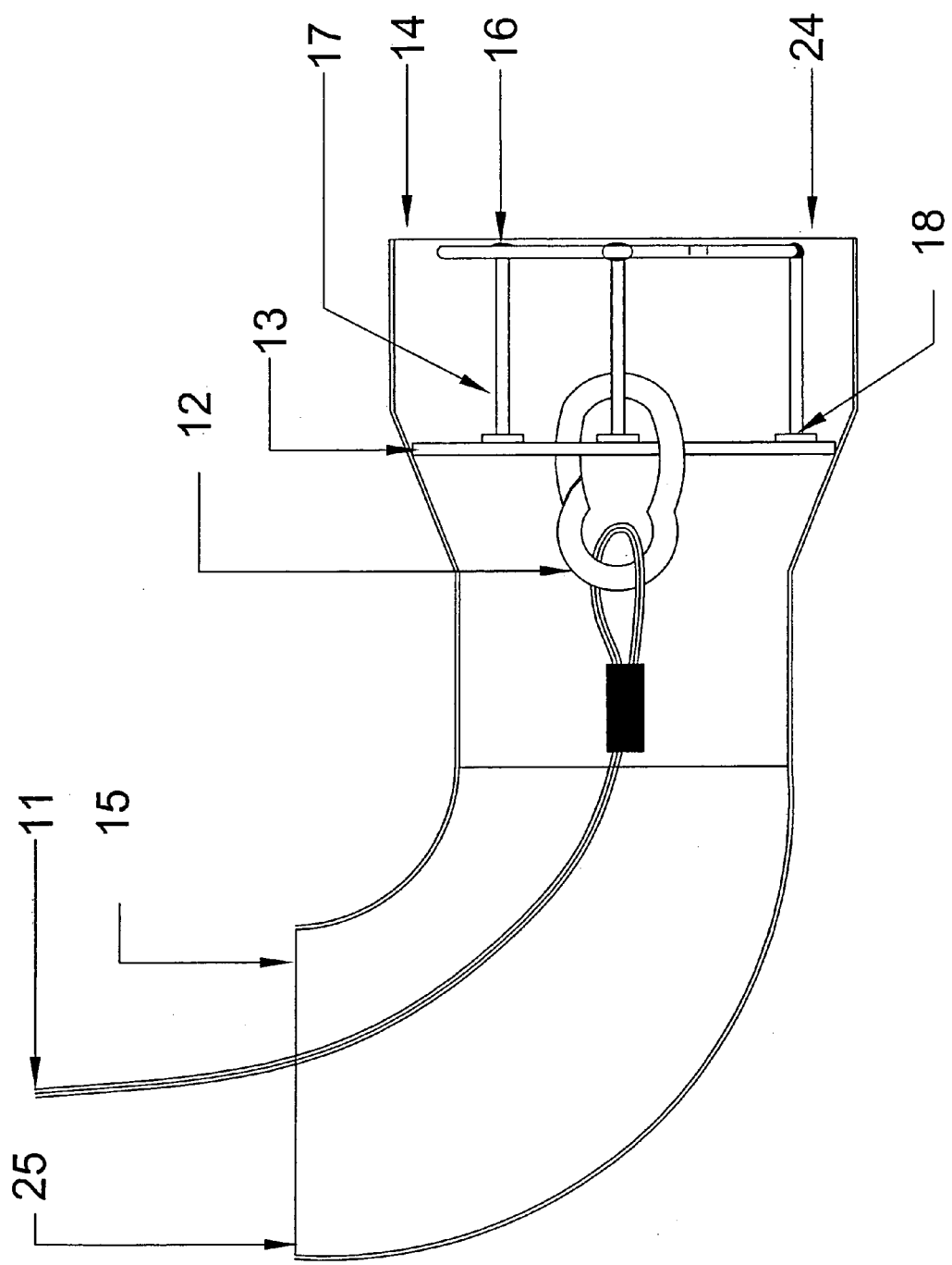

FIG. THREE is a front view of the Nozzle Elbow.

FIG. FOUR is a side view of the Nozzle Elbow With Static Cable, Connector Ring, Snap Ring and Snap Ring Mounting Bracket. The Nozzle Elbow itself is a cut-away view for illustration.

FIG. FIVE is a side view of the whole assembly.

DESCRIPTION OF PREFERRED EMBODIMENT

Referring specifically to FIGURE FIVE, a Track is suspended from a ceiling. A Trolley Plate 2 is fitted with four Thrust Load Wheels 3, two on each side of the Track 1, and four Radial Load Wheels 4, two on each side of the interior of the Track. The Trolley Plate 2 is oriented in the horizontal plane, however, said Trolley Plate 2 is bent downward in the front and back thereby providing a surface with a vertical orientation perpendicular to said Track 1. A Pneumatic Damper 5 is attached to the Track 1 such that the Pneumatic Damper 5 contacts the one vertical components of the Trolley Plate 2 when said Trolley Plate 2 approaches that end of the Track 1. The other end of the Track 1 could be equipped with another Pneumatic Damper 5 or just a Stop 6, depending on whether the fire station has one set of doors or two.

An Upper Static Cable 7 is attached to the Trolley Plate 2 and a Cable Bracket 8 having an outside eyelet and an inside eyelet. The Cable Bracket 8 is welded securely through an Upper Elbow 9. Said Upper Elbow is equipped with a Swivel Joint 10. A Lower Static Cable 11 is connected to the inside eyelet of the Cable Bracket 8 and Connector Ring 12.

Referring to FIGURE TWO, the Connector Ring 12 is connected to the Nozzle Snap Ring Mounting Bracket 13.

Referring to FIGURE FOUR, the Nozzle Snap Ring Mounting Bracket 13 is welded to the inside circumference of the Nozzle 14. Said Nozzle 14 having an Inlet 24 and Outlet 25. Said nozzle inlet should be larger than the snap ring to allow for the introduction of ambient air into the nozzle.

The Nozzle 14 is welded to the Nozzle Elbow 15. A Snap Ring 16 is a tempered high carbon ring with a cut through the ring. Said Snap Ring 16 has a good "memory". In other words, it returns to its original shape with no plastic deformation. The Snap Ring's 16 minor diameter is approximately three-sixteenths of an inch and its greater diameter is approximately five and one-half inches. Said Snap Ring 16 has three Legs 17 each of which terminate in a Mounting Foot 18 with a hole corresponding with the holes in the Nozzle Snap Ring Mounting Bracket 13. The Mounting Feet 18 are bolted to the Nozzle Snap Ring Mounting Bracket 13.

Referring back to FIGURE FIVE, a High Visibility Flexible Hose 19 approximately nine feet long and five inches in diameter is connected to the Swivel Joint 10 and the Nozzle Elbow 15. Said connections being air tight.

Referring to FIGURE ONE, the vehicle exhaust pipe is fitted with an Exhaust Pipe Adapter 20 by clamping. Said Exhaust Pipe Adapter 20 has Step Rings 21 incorporated into the design so as to accommodate different standard sizes of exhaust pipes. The larger the exhaust pipe; the more Step Rings 21 are cut away. A Seat 22 is provided on said Exhaust Pipe Adapter 20 to accommodate the Snap Ring 16. A Bevel 23 is also provided on said Exhaust Pipe Adapter 20 for guiding the Snap Ring 16 onto the Seat 22.

I claim:

1. A vehicle exhaust system hose and coupling assembly comprising:

a suspended pipe;

a flexible hose having a first end and a second end;

a nozzle having an inlet and outlet with a snap ring mounting bracket being disposed on said nozzle;

said flexible hose first end being connected to said pipe and said flexible hose second end being connected to said nozzle outlet;

a tether inside said flexible hose whereby one end of said tether is connected to said pipe and the other end of said tether is connected to said nozzle, said nozzle having a connector wherein said connector is a circular snap ring with at least one cut through said snap ring to accommodate mechanical expansion;

said snap ring being connected to the snap ring mounting bracket at a plurality of points by a plurality of legs; and said snap ring being capable of connecting and disconnecting from a seat which seat is integral to a separate exhaust pipe adapter which said exhaust pipe adapter is capable of being attached to a vehicle exhaust pipe.

2. A vehicle exhaust system hose and coupling assembly of claim 1 wherein ambient air is allowed to infiltrate into the inlet of said nozzle.

* * * * *